July 10, 1934.   C. B. LANGSTROTH ET AL   1,965,657
WELDING ELECTRODE AND METHOD OF MANUFACTURING THE SAME
Original Filed Oct. 24, 1931
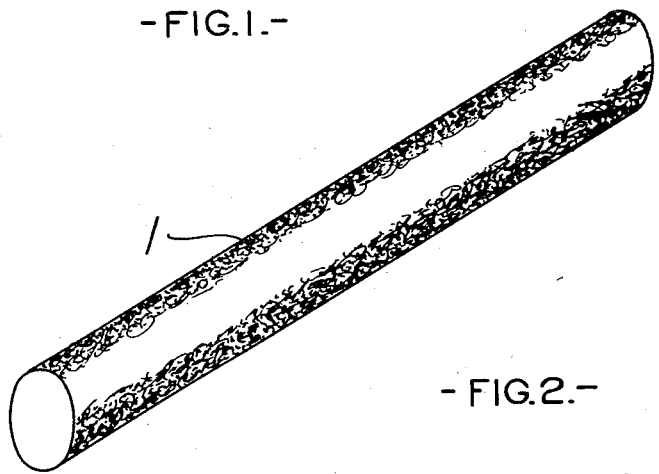
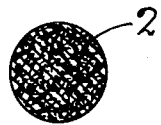
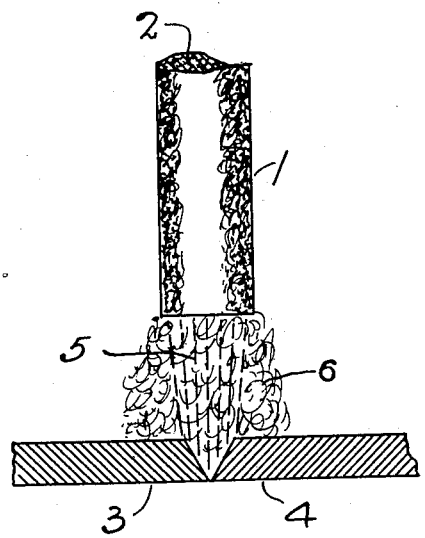
INVENTORS
Clifford B. Langstroth
Edwin M. Martin
BY
ATTORNEY Patented July 10, 1934

1,965,657

UNITED STATES PATENT OFFICE 1,965,657

WELDING ELECTRODE AND METHOD OF MANUFACTURING THE SAME

Clifford B. Langstroth, Plainfield, N. J., and Edwin M. Martin, New York, N. Y.

Original application October 24, 1931, Serial No. 570,834, now Patent No. 1,930,649, dated October 17, 1933. Divided and this application April 27, 1932, Serial No. 607,734

14 Claims. (Cl. 219—8)

This invention relates to weld rods and particularly to improvements in welding electrodes and the method of manufacturing the same.

An object is to provide an electrode of the character described which will be characterized by a maximum degree of toughness, durability and flexibility.

A further object is to provide a novel electrode of the character described which will comprise a material adapted to efficiently serve the desired purpose of protecting the fused metal of the weld while being relatively inexpensive.

Other and further objects of and advantages achieved by the instant invention will be seen by the following detailed description.

In the practice of welding by a weld rod electrode, as is well known in the art, a metallic electrode or weld rod is held a short distance from the metal parts to be joined and an electric current is passed through the rod and the metal parts to be joined, forming an arc between the rod and the metal parts. The arc melts or fuses the parts where they are to be joined as well as the rod, and the fused metal from the latter supplies the necessary additional metal for the joint. In this operation special difficulties are met with in that certain constituents of the atmosphere, more particularly oxygen and nitrogen, effect a chemical reaction with the molten metal, which results in an impairment in the quality of the weld. In common practice it has been found desirable to provide means for shielding the arc and area where the molten metal is deposited, during the welding operation, from the atmosphere so as to avoid the aforesaid undesirable influences thereof.

Heretofore solid metallic rods have been employed and the shielding has been accomplished in divers ways. The most commonly used method of shielding employs a weld rod comprising a solid metal core provided with a coating containing material which during the welding operation disintegrates and vaporizes, the vapors surrounding the arc and the area where the molten metal is deposited, and providing a protective envelope against the atmosphere. While such method and weld rods have been found practical and efficient, the present invention provides a novel and improved rod which also accomplishes practical and efficient results, while at the same time being simpler and less expensive to manufacture. It will be understood that in this description and in the appended claims where the word "electrode" is used it is intended to mean a weld rod electrode.

The invention is illustrated in the accompanying drawing, in which:

Figure 1 is a perspective view of a weld rod electrode embodying the present invention; Fig. 2 is a cross section of the electrode of Fig. 1; and Fig. 3 is an elevation showing a part of the weld rod during a welding operation, with the metal parts being welded shown in section, an arc being indicated by broken lines, and protective vapors being indicated by curved lines.

Referring in detail to the drawing, the rod 1 of the present invention is made of a heterogeneous composition containing the desired metallic elements to be fused with the metal parts to be welded, preferably in granular form, and a mixture of materials for regulating the arc and for providing a protective vapor, through which the arc will pass, and which vapor will insulate the molten metal of the weld from the atmosphere during a welding operation.

It is also a part of the present invention to employ the desired metallic elements of the electrode in shredded form, so that the elements will have a tendency to engage each other and the other substances of the rod, thereby making for a sturdy construction. The employment of the metallic elements in either granular or shredded form in the manufacture of the rod facilitates the proper combining of different metals for the rod, when desirable, as where alloys are being welded.

The base of the mixture with which the metallic elements of the electrode are incorporated is a carbo-hydrate material, which in the preferred form of the invention is a cellulose, specifically wood, indicated in the drawing by the numeral 2. It will be understood, however, that any suitable carbo-hydrate material may be employed. Heretofore, such cellulosic materials have been employed in weld rod coatings in granular form. The present invention in its preferred form departs from this practice and employs an improvement, hereinafter described with regard to the form of the cellulosic material, which constitutes another feature of the present invention. The several component parts of the electrode of the present invention are mixed together in a heterogeneous mass while in a plastic state and thereupon moulded into rod form.

In a prior co-pending application Serial No. 570,834, filed October 24, 1931, by the applicants herein, since matured into Patent No. 1,930,649, dated Oct. 17, 1933, of which prior application the present application is a division, there is described and illustrated an improved electric weld rod employing a novel material for producing, among other results, the desired protective vapors hereinbefore mentioned. This material constitutes a cellulosic substance in the shredded form. In the instant invention, likewise, the preferred embodiment employs this cellulosic material in shredded form. The shreds, indicated in the drawing by the numeral 2, are evenly mixed throughout the composition and provide the highly desirable property of producing the protective gas as well as serving to better hold the composition together, and to make for an especially tough and durable rod. Further, such material has the important advantageous property of being inexpensive and easy to manufacture. It is to be understood, however, that the present invention, in its broad aspect, is not limited to this feature of the improved carbo-hydrate material, but that any suitable material in any suitable form such as granulated or comminuted may be employed.

To act as a binder for the materials comprised in the rod, silicate of soda is employed as one of the chief ingredients. The silicate of soda also serves to quiet the arc and to refine the melted metallic elements during the welding operation.

Calcium carbonate may also be added to lower the melting point at which the arc will hold, and thereby allow a lower temperature so as to diminish the chance of carbon or other desirable elements being destroyed.

A reducing agent is also introduced into the mixture. This reducing agent in the preferred form of the invention is silico manganese, which serves to reduce the oxides from the deposited metal.

There may be further introduced into the mixture a hydro-carbon oil, preferably of the non-drying variety such as peanut oil. This ingredient is advantageous in that it makes for a more flexible rod, so that the rod, when necessary, may be curved or bent without cracking or crumbling.

In an approved embodiment of the invention the proportionate amounts of the ingredients comprised in the rod are as follows:

Metallic elements—85 parts; shredded wood—10 parts; silicate of soda—3 parts; silico-manganese—1 part; peanut oil—1 part. These materials, as aforesaid, are mixed together while in a plastic state and the mass is moulded into the desired rod shape by passing the same through a stuff chest, the rod being thereupon baked or dried to the desired hardness. The stuff chest may be of any well-known construction such as for instance, that shown in Patent No. 1,347,184, issued to R. S. Smith, July 20, 1920.

The improved method of manufacturing a weld rod electrode comprises first, mixing the metallic elements together with the vapor producing materials, the binder and any other desired materials, this mixing being done while the ingredients are in the form of a plastic heterogeneous mass; then passing through a stuff chest, of any usual type, to mould the ingredients into rod form; and then baking or drying the rod to the desired toughness or hardness. There will be thus produced an efficient and durable rod which while simple and relatively inexpensive to manufacture will be characterized by strength and flexibility.

In the use of the rod of the present invention, as illustrated in Fig. 3 of the drawing, when the rod 1 is properly connected above the metal parts 3 and 4, to be welded together, and current is passed through the rod and parts, an arc indicated by the broken lines 5 will be produced, and at the same time the heat of the arc and of the weld rod will effect a disintegration and vaporization of the cellulosic material at the end of the rod, the vapor passing downward from the end of the rod to the parts 3 and 4, as indicated by the lines 6, and producing a gaseous zone through which the arc passes, and which completely surrounds the arc and the area where the molten metal is being deposited, thereby protecting the molten metal and the weld from the atmosphere and its deteriorating influences during the welding operation.

While there has been hereinbefore described certain specific ingredients and definite proportions of ingredients for the weld rod of the instant invention, it will be understood that the present invention is not limited to the use of all the ingredients or to the specific ingredients described, or to the proportions specified, but that various selections of the ingredients, or any like substances having similar properties, may be employed in any suitable proportions, and that all and any changes and modifications of the hereinbefore described preferred form of the invention as fall within the scope of the appended claims, are contemplated as a part of the present invention.

The invention claimed and desired to be secured by Letters Patent, is:

1. An electrode for electric arc welding comprising a mass of metallic elements; and a material for producing a protective vapor mixed with said metallic elements and bound therewith.

2. An electrode for electric arc welding comprising a mass of comminuted metallic elements; and a material for producing a protective vapor mixed with said metallic elements and bound therewith.

3. An electrode for electric arc welding comprising comminuted metallic elements; and a material for producing a protective vapor mixed with said metallic elements and bound therewith, said material being in a shredded form.

4. An electrode for electric arc welding comprising a mass of metallic elements; a material for producing a protective vapor, either said elements, said material, or both, being in a shredded form; and a binder holding said elements and material together.

5. An electrode for electric arc welding comprising a mass of metallic elements; an oxide reducing material mixed therewith; and a binding material holding said elements and material together.

6. An electrode for electric arc welding comprising a mass of metallic elements; and a mass of solid carbo-hydrate elements for producing a protective vapor mixed with said metallic elements and bound therewith.

7. An electrode for electric arc welding comprising a mass formed as a rod, including metallic elements; and silico manganese.

8. An electrode for electric arc welding comprising a mass formed as a rod, including metallic elements; cellulosic material in shredded form; sodium silicate; and silico manganese.

9. The method of manufacturing arc welding electrodes which comprises mixing together metallic elements, a carbo-hydrate material and a binder into a plastic heterogeneous mass; moulding said mass into rod form; and heating said rod to the desired toughness.

10. The method of manufacturing arc welding electrodes which comprises mixing metallic elements with a cellulosic material; moulding said elements and material into rod form; and treating said rod to produce a desired toughness thereof.

11. The method of manufacturing arc welding electrodes which comprises mixing metallic elements with a cellulosic material and sodium silicate; moulding said elements and material into rod form; and treating said rod to produce a desired toughness thereof.

12. The method of manufacturing arc welding electrodes which comprises mixing metallic elements with a cellulosic material and silico manganese; moulding said elements and material into rod form; and treating said rod to produce a desired toughness thereof.

13. The method of manufacturing arc welding electrodes which comprises mixing metallic elements with a cellulosic material and a substantially non-drying hydro-carbon oil; moulding said elements and material into rod form; and treating said rod to produce a desired toughness thereof.

14. An electrode for electric arc welding comprising a mass of metallic elements; a material for producing a protective vapor; and a binding material holding said elements and vapor producing material together.

CLIFFORD B. LANGSTROTH.
EDWIN M. MARTIN.